No. 627,759. Patented June 27, 1899.
H. W. NEILD.
JOINT FOR ELECTRIC CONDUCTORS.
(Application filed Nov. 14, 1898.)

(No Model.)

Witnesses
E. A. Balloch.
A. M. Parkius.

Inventor
Harry W. Neild
By his Attorneys

UNITED STATES PATENT OFFICE.

HARRY WILLIAM NEILD, OF LONDON, ENGLAND.

JOINT FOR ELECTRIC CONDUCTORS.

SPECIFICATION forming part of Letters Patent No. 627,759, dated June 27, 1899.

Application filed November 14, 1898. Serial No. 696,370. (No model.)

*To all whom it may concern:*

Be it known that I, HARRY WILLIAM NEILD, engineer, a subject of the Queen of Great Britain, residing at 89 Blackheath road, London, in the county of Kent, England, have invented a certain new and useful Joint for Electric Conductors, of which the following is a specification.

The joint is made by passing the ends of the two wires to be joined through a tube or sleeve of suitable size which has near the center about half the section cut away, thus exposing the two wires to be joined at this part of the sleeve. When the wires are taut, the ends are bent over, thus keeping them in position while the joint is made absolute by soldering or brazing the wires together through the opening in the sleeve.

Figure 1:
Figure 3:
Figure 2:
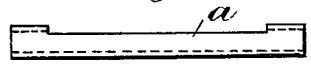
Figure 4:

Figure 1 is a plan, Fig. 2 a side elevation, and Fig. 3 an end elevation, of the sleeve. Fig. 4 is a plan of the completed joint.

$a$ is the sleeve, of oval section, just large enough to receive the wires $b$ side by side, and the opening at the center of the sleeve is made through one of its flatter sides.

$c$ is solder filling the interstices between the wires $b$ and the tube $a$.

To join copper wires, the sleeve is of copper or its alloys, preferably tinned inside with a suitable solder. Heat is then applied by a soldering-iron or other well-known means, with suitable solder, to the wires where they are exposed through the opening in the sleeve, and the two wires are thus joined in sight of the operator.

For iron or steel wire the ends, at least, should be previously cleaned or treated by the ordinary galvanizing process, and the sleeves should also be so treated inside, whether they be of copper or its alloys, steel, or iron, and the joint should be made by heating through the open part of the sleeve and joining the wires with a solder principally composed of zinc, which will adhere to the cleaned or galvanized parts of the wires and the sleeve previously treated as above. Aluminium wire can be joined in very much the same manner, using either sleeves of aluminium, iron, steel, or copper or its alloys; but by preference the solder of zinc should be alloyed with a small proportion of aluminium.

Although satisfactory joints can be made, as above described, by using sleeves of a different metal to the wire to be joined, it is preferable to use a sleeve of the same metal as the wire.

When there is any strain on the wires to be joined, as is the case with air-lines, the ends of the wires $b$, after being passed through the sleeve $a$, are bent, as shown at $b'$, Fig. 4, which not only strengthens the joint, but takes the strain while the joint is being made.

The use of this invention avoids the uncertainty which must always occur where joints are made in sleeves in a continuous tube, where the result of the soldering process is hidden from view. It also enables the joint to be made in the center of the sleeve, (or joint,) where the wires overlap, and the heat applied to effect the soldering is thereby prevented from affecting the main wires and weakening them by their being made soft by the heat applied, and only the joint, where the wires are double, is so affected.

What I claim is—

1. A sleeve open at one side for part of its length and coated internally with solder.

2. The combination of a sleeve open at one side for part of its length two conductors lying side by side in the sleeve and solder filling the interstices between the conductors and the sleeve.

3. The combination of a sleeve open at one side for part of its length two conductors lying side by side in the sleeve their ends protruding beyond the sleeve and being bent at an angle to their length and solder filling the interstices between the conductors and the sleeve.

HARRY WILLIAM NEILD.

Witnesses:
  WILFRED CARPMAEL,
  DEANSTON CARPMAEL.